United States Patent [19]

Pagano

[11] Patent Number: 4,982,909
[45] Date of Patent: Jan. 8, 1991

[54] FILM CARTRIDGE AND METHOD OF ASSEMBLING THE SAME

[75] Inventor: Daniel M. Pagano, Henriette, N.Y.

[73] Assignee: Eastman Kodak Company, Rochester, N.Y.

[21] Appl. No.: 464,255

[22] Filed: Jan. 12, 1990

[51] Int. Cl.[5] ............................................. B65D 85/672
[52] U.S. Cl. .................................... 242/71.2; 206/393; 354/275
[58] Field of Search .............. 206/316, 389, 391, 393; 242/199, 200, 202, 205, 58.6, 71.1, 71.2; 354/275

[56] References Cited

U.S. PATENT DOCUMENTS

| | | | |
|---|---|---|---|
| 1,440,173 | 12/1922 | Ponting et al. | 242/71.2 |
| 1,707,767 | 4/1929 | Pointing et al. | 242/71.2 |
| 1,871,232 | 8/1932 | Foster | 242/199 |
| 1,871,233 | 8/1932 | Proctor | 242/71.2 |
| 1,932,401 | 10/1933 | Foster | 242/71.2 |
| 1,944,023 | 1/1934 | Ford | 242/71.2 |
| 1,975,782 | 10/1934 | Foster | 242/71.2 |
| 3,276,714 | 10/1966 | Steisslinger et al. | 242/71.2 |
| 3,425,531 | 2/1969 | Fuld | 197/15.1 |
| 3,425,532 | 2/1969 | Dannatt | 197/151 |
| 3,482,681 | 12/1969 | Nerwin et al. | 206/46 |
| 3,701,495 | 10/1972 | Holliday | 242/197 |
| 3,918,075 | 11/1975 | Horn et al. | 354/213 |
| 4,146,321 | 3/1979 | Melillo | 354/203 |
| 4,175,719 | 11/1979 | Speckman et al. | 242/197 |
| 4,290,680 | 9/1981 | Muramatsu et al. | 354/203 |
| 4,488,796 | 12/1984 | Edwards | 354/275 |

FOREIGN PATENT DOCUMENTS

| | | | |
|---|---|---|---|
| 0620062 | 4/1927 | France | 242/71.2 |
| 0271440 | 9/1963 | Japan . | |
| 0210878 | 2/1924 | United Kingdom | 242/71.2 |

Primary Examiner—Jimmy G. Foster
Attorney, Agent, or Firm—Roger A. Fields

[57] ABSTRACT

A film cartridge comprises a pair of film supply and film take-up housings and an intermediate bridge portion along which a filmstrip may be advanced from the film supply housing to the film take-up housing. The film supply and film take-up housings are separately connected at respective pivotal couplings to the bridge portion to permit the two housings to be individually folded against the bridge portion for storage purposes.

5 Claims, 3 Drawing Sheets

FILM CARTRIDGE AND METHOD OF ASSEMBLING THE SAME

BACKGROUND OF THE INVENTION

1. Field of the Invention

The invention relates generally to the field of photography and particularly to film cartridges.

2. Description of the Prior Art

One general type of known film cartridge holds single-perforated 35 mm film in 12- or 20-exposure lengths for 26×26 mm pictures. The cartridge comprises a pair of film supply and film take-up housings having respective film passage openings, and an intermediate bridge portion along which the film may be advanced from the supply chamber to the take-up chamber.

Some magazines of this general type have the film supply housing and the film take-up housing hinged together at a single joint coupling for relative movement about a corresponding pivot axis. See U.S. Pat. Nos. 1,440,173, 1,871,233, and 1,944,023.

SUMMARY OF THE INVENTION

As in the prior art, there is provided a film cartridge comprising a pair of film supply and film take-up housings and an intermediate bridge portion along which a filmstrip may be advanced from the supply housing to the take-up housing. According to the invention, however, the film supply and film take-up housings are separately connected at respective pivotal couplings to the bridge portion to permit the two housings to be individually folded against the bridge portion.

DETAILED DESCRIPTION OF THE PREFERRED EMBODIMENT

The invention is disclosed as being embodied preferably in a 35 mm film cartridge. Because the features of this type of film cartridge are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
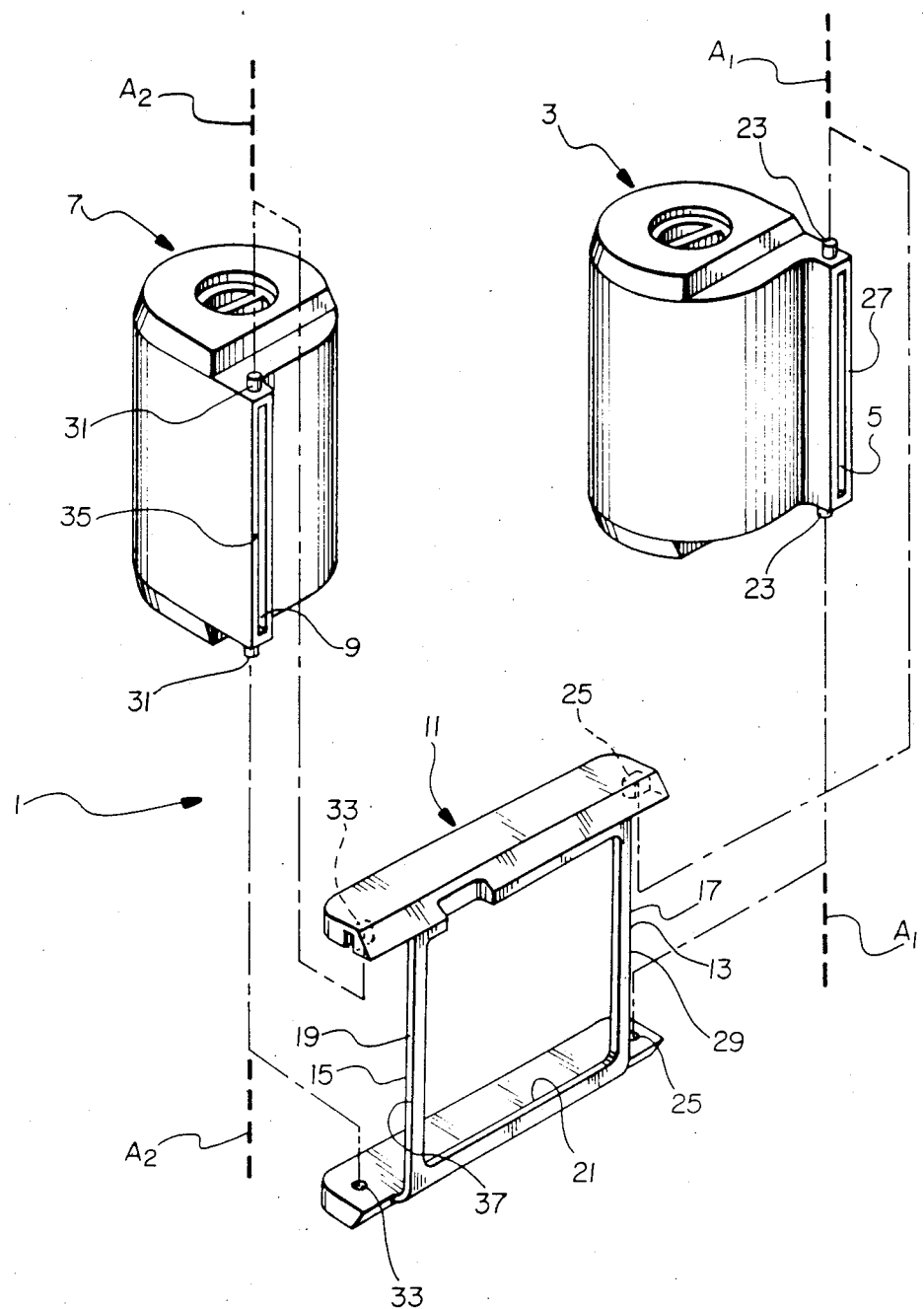
FIG. 1 is an exploded perspective view of a film cartridge according to a preferred embodiment of the invention.

Referring now to the drawings, FIG. 1 shows a film cartridge 1 comprising a film supply housing 3 having a film egress opening 5, a film take-up housing 7 having a film ingress opening 9, and an intermediate bridge portion 11 having film entry and exit areas 13 and 15 at its opposite ends 17 and 19 and a rectangular-shaped opening 21 between the opposite ends for exposing successive sections of a filmstrip F advanced along the bridge portion from the supply housing to the take-up housing. As is typical, the unexposed film is wound on a known supply spool (not shown) rotatably supported within the supply housing 3 and the exposed film is wound on a known take-up spool (not shown) rotatably supported within the take-up housing 7.

Figure 2:
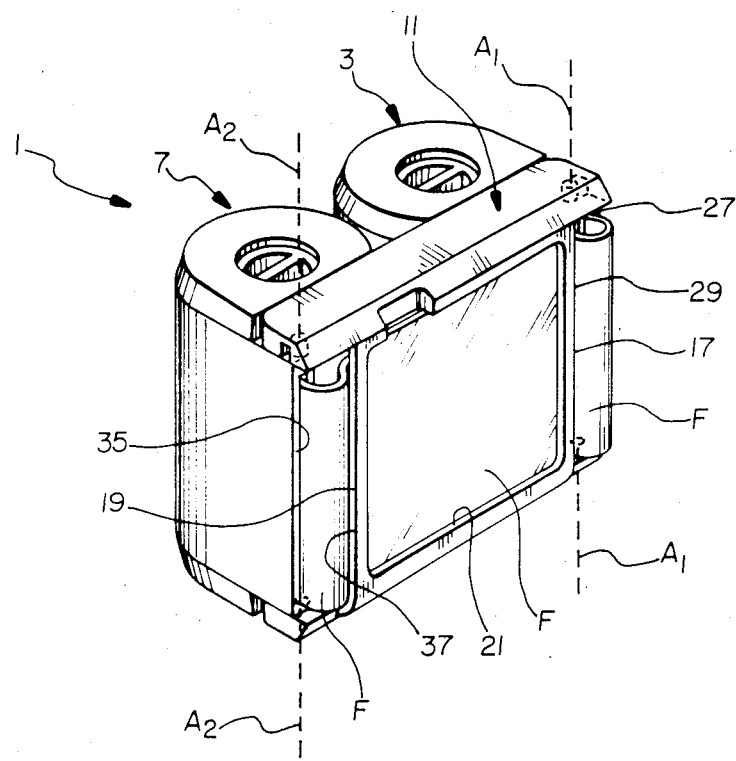
FIG. 2 is a perspective view of the film cartridge, shown in a folded position for storage.
Figure 3:
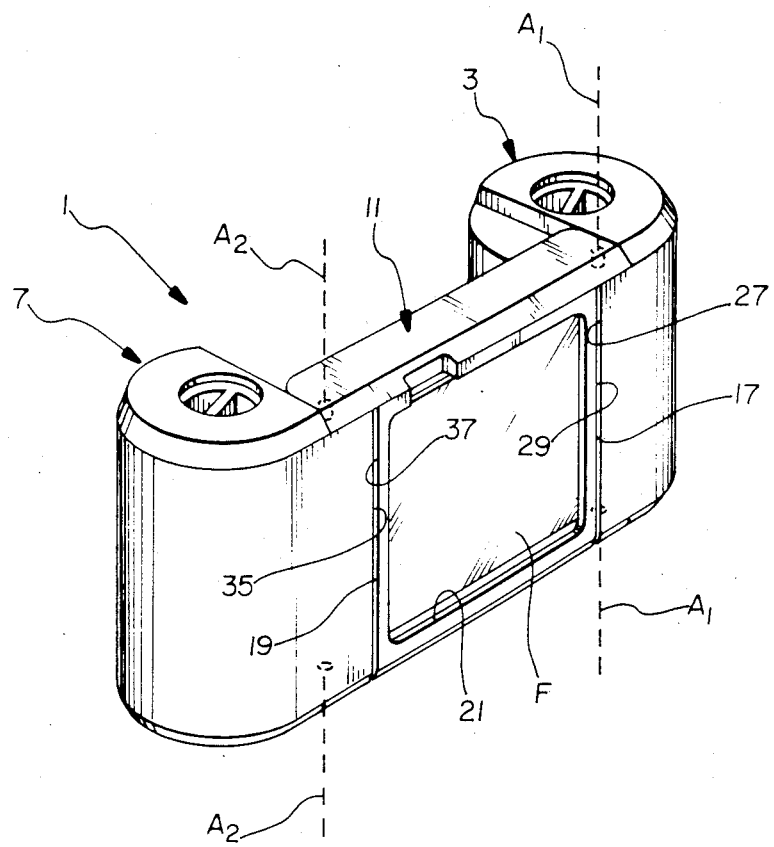
FIG. 3 is a perspective view of the film cartridge, shown in an unfolded position for use.

The film supply housing 3 includes a pair of integral coaxial posts 23, proximate its film egress opening 5, which are received in respective cavities 25 in the bridge portion 11, proximate its film entry area 13. The two posts 23 and the corresponding cavities 25 define a joint coupling of the supply housing 3 and the bridge portion 11 to permit pivotal movement of the supply housing relative to the bridge portion about a pivot axis $A_1$ between a folded or storage position shown in FIG. 2 and an unfolded or use position shown in FIG. 3. In the folded position shown in FIG. 2, the supply housing 3 is folded flush against the bridge portion 11 to cover approximately one-half of the rectangular-shaped opening 21 in the bridge portion. In the unfolded position shown in FIG. 3, the supply housing 3 is removed from the rectangular-shaped opening 21 and, instead, its film egress opening 5 is aligned with the film entry area 13 in the bridge portion 11 to facilitate movement of the filmstrip F through the latter two openings. Cooperating planar surfaces 27 and 29 on the supply housing 3 and the bridge portion 11 abut to limit unfolding of the supply housing to its unfolded position.

The film take-up housing 7 includes a pair of integral coaxial posts 31, proximate its film ingress opening 9, which are received in respective cavities 33 in the bridge portion 11, proximate its film exit area 15. The two posts 31 and the corresponding cavities 33 define a joint coupling of the take-up housing 9 and the bridge portion 11 to permit pivotal movement of the take-up housing relative to the bridge portion about a pivot axis $A_2$ between a folded or storage position shown in FIG. 2 and an unfolded or use position shown in FIG. 3. The pivot axis $A_2$ extends parallel to the pivot axis $A_1$. In the unfolded position shown in FIG. 2, the take-up housing 7 is folded flush against the bridge portion 11 to cover approximately the remaining half of the rectangular-shaped opening 21 in the bridge portion not covered by the film supply housing 3. In the unfolded position shown in FIG. 3, the take-up housing 7 is removed from the rectangular-shaped opening 21 and, instead, its film ingress opening 9 is aligned with the film exit opening 15 in the bridge portion 11 to facilitate movement of the filmstrip F through the latter two openings. Cooperating planar surfaces 35 and 37 on the take-up housing 7 and the bridge portion 11 abut to limit unfolding of the take-up housing to its unfolded position.

The invention has been described with reference to a preferred embodiment. However, it will be appreciated that variations and modifications can be effected within the ordinary skill in the art without departing from the scope of the invention.

I claim:

1. A film cartridge comprising a pair of film supply and film take-up housings having respective film passage openings, and an intermediate bridge portion along which a filmstrip may be advanced from said film supply housing to said film take-up housing, characterized in that:

said bridge portion and said film supply housing are connected at a first joint coupling for relative pivotal movement about a first pivot axis and the bridge portion and said film take-up housing are connected at a second joint coupling for relative pivotal movement about a second pivot axis; and said bridge portion is a single piece rigid and non-folding continuously between said first and second joint couplings, and it has sufficient length to enable both of said film supply and take-up housings to be folded simultaneously against said single piece for storage purposes.

2. A film cassette as recited in claim 1, wherein said first and said joint couplings are arranged to dispose the first and second pivot axes substantially parallel to one another.

3. A film cartridge as recited in claim 1, wherein said bridge portion includes a rectangular-shaped opening for exposing successive sections of a filmstrip advanced along the bridge portion.

4. A film cartridge as recited in claim 3, wherein said bridge portion and said film supply and film take-up housing are correspondingly shaped to permit the two housings to be folded against the bridge portion to cover said rectangular-shaped opening and to be unfolded from the bridge portion to uncover the rectangular-shaped opening.

5. A film cartridge as recited in claim 4 wherein said bridge portion and said film supply and film take-up housings include cooperating means for limiting unfolding of the two housings from the bridge portion to respective positions in which said film passage opening of one of the housings is aligned with one end of the bridge portion and said film passage opening of the other housing is aligned with another end of the bridge portion.

* * * * *